Nov. 4, 1958 W. R. BASTOW 2,859,410
BALANCED MODULATORS
Original Filed March 14, 1951
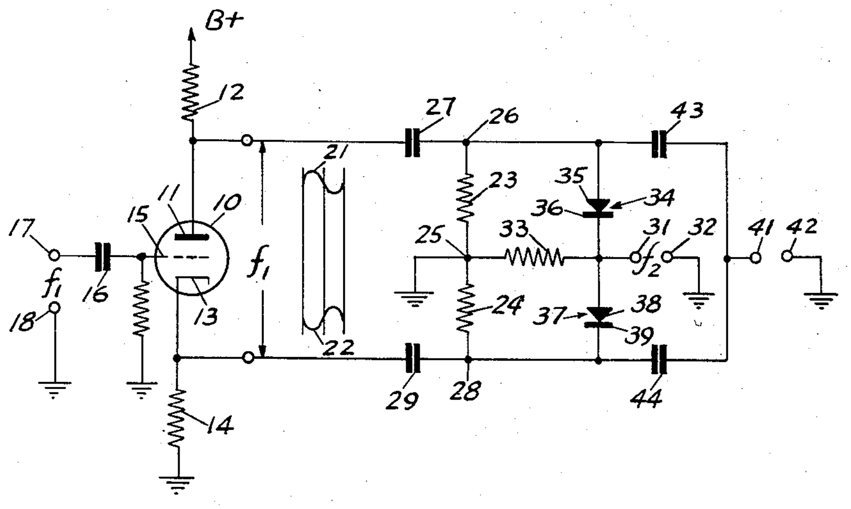
INVENTOR
WENDELL R. BASTOW
BY Elmer J. Gorn
ATTORNEY United States Patent Office 2,859,410

Patented Nov. 4, 1958

2,859,410

BALANCED MODULATORS

Wendell R. Bastow, Natick, Mass., assignor to Raytheon Manufacturing Company, Newton, Mass.

Continuation of abandoned application Serial No. 215,549, March 14, 1951. This application May 2, 1956, Serial No. 582,237

4 Claims. (Cl. 332—47)

This is a continuation of my application, Serial No. 215,549, filed March 14, 1951, now abandoned.

This invention relates to balanced-modulator and signal-mixing circuits, and, more particularly, to such circuits which are of light weight and small size and adapted for use at low or high frequencies.

The invention employs diode devices which may be of the dry or contact type and small circuit elements, such as resistors and capacitors, which avoid great weight and size. In accordance with the invention, a push-pull reference voltage from a local oscillator, for example, is applied across a resistor, so that the voltages at the ends of the resistor are equal in magnitude and 180 degrees out of phase. A signal voltage, having a frequency different from that of the reference voltage, is then applied through rectifiers to alter the impedance to ground at the aforesaid end points of the resistor, in accordance with the amplitude and polarity of the signal voltage and in phase opposition at the end points. An output is taken from both end points in common to ground, through suitable coupling capacitors which are preferably of like reactance at the reference frequency, and this output contains only the signal frequency and sum and difference frequencies of the signal and reference voltages and their harmonics.

Further advantages and features of the present invention will become more apparent from the detailed discussion of an embodiment thereof which follows. This discussion refers to the accompanying drawing, the sole figure of which illustrates a circuit in accordance with the invention.

In the drawing, an electron tube 10 has its anode 11 connected to a source of anode potential through a resistor 12 and its cathode 13 connected to ground through a second resistor 14. A signal of the reference frequency $f_1$ is applied to the control grid 15 through a coupling capacitor 16 and input terminals 17 and 18. The circuit of the electron tube 10 will be recognized as a phase inverter, and this circuit provides two voltage waves 21 and 22 at the frequency $f_1$ of mutually opposite phase and balanced to ground.

First and second resistors 23 and 24, equal in magnitude, are connected together in series and grounded at their junction 25. The free end 26 of the first resistor 23 is connected to the anode 11 via a first capacitor 27, while the free end of the second resistor 28 is connected to the cathode 13 via a second capacitor 29. The first and second capacitors 27 and 29 have substantially equal reactance at the frequency $f_1$, and this reactance is preferably approximately equal in magnitude to the resistance of either of resistors 23 or 24.

A pair of signal terminals 31 and 32 are employed to introduce the signal of frequency $f_2$ which is to be modulated. The first of these terminals 31 is connected to the junction 25 of the first and second resistors, and hence to ground, via a third resistor 33. The second signal input terminal 32 is grounded. A first diode 34 has its anode 35 connected to point 26, and its cathode 36 connected to the first signal intput terminal 31. A second diode 37 has its anode 38 connected to the first signal input terminal 31 and its cathode 39 connected to point 28. Thus, the diodes 34 and 37 are connected in series across the resistors 23 and 24, and the third resistor 33 joins the junction of the first two resistors with the junction of the diodes.

The modulated output appears at output terminals 41 and 42, the latter of which is grounded. The first output terminal 41 is connected to both points 26 and 28 via capacitors 43 and 44, whose reactances are equal at the reference frequency.

In operation, a push-pull reference voltage at the frequency $f_1$ and balanced to ground is applied to the capacitors 27 and 29 and therethrough across the resistors 23 and 24. Since these resistors are grounded at their common center, the voltages at the end points 26 and 28 are equal in magnitude and 180 degrees out of phase, as is illustrated by the curves 21 and 22. The voltage frequency $f_1$ appearing at the output terminals 41 and 42 is then zero in magnitude, since the reactances of the output capacitors 43 and 44 are equal.

If, now, a signal voltage at frequency $f_2$ is applied between the signal input terminals 31 and 32, the impedance to ground at points 26 and 28 will be changed in accordance with the amplitude and polarity of the signal voltage, the impedance increasing at point 26 and decreasing at point 28, or vice versa. The diodes 34 and 37 will alternately reduce and increase the impedance of each of the points 26 and 28 with respect to ground, and this will be done in phase opposition. The modulation products at the output terminals will then be the frequencies $f_2$, $(f_1 \pm f_2)$, $(n_1 f_1 \pm n_2 f_2)$ etc., where $n_1$ and $n_2$ are higher harmonics of $f_1$ and $f_2$.

The foregoing circuit finds widespread use where it is desired to suppress the reference, or local oscillator, voltage in the absence of a carrier, or signal, voltage, or vice versa. As will be appreciated, this circuit is particularly useful where small size and light weight are important, for it employs components which are easily built to these requirements.

Many modifications and variations of the foregoing circuit will occur to those skilled in the art, without exercise of invention, and it is accordingly intended that the claims which follow shall not be limited by particular details of the illustrated embodiment, but only by the true spirit and scope of the invention.

What is claimed is:

1. Signal-mixing apparatus comprising first and second input terminals, first and second capacitors each connected at one side to one of said terminals, a resistor joining the remaining sides of said capacitors, first and second rectifiers similarly poled connected in series across said resistor, said capacitors having substantially equal impedances at a first frequency, and means to apply a signal of a second frequency between the junction of said two rectifiers and an intermediate point of said resistor.

2. Signal-mixing apparatus comprising first and second input terminals, first and second capacitors each connected at one side to one of said terminals, a resistor joining the remaining sides of said capacitors, first and second rectifiers similarly poled connected in series across said resistor, third and fourth capacitors connected in series across said resistor, said first and second capacitors having substantially equal impedances at a first frequency, said third and fourth capacitors having substantially equal impedances at said first frequency, means to apply a signal of a second frequency between the junction of said two rectifiers and an intermediate point of said resistor, and an output terminal at the junction of said third and fourth capacitors.

3. Signal-mixing apparatus comprising first and second input terminals, first and second capacitors each connected at one side to one of said terminals, a first resistor joining the remaining sides of said capacitors, first and second rectifiers connected in series with the same polarity across said first resistor, third and fourth capacitors connected in series across said first resistor, an output terminal at the junction of said third and fourth capacitors, a second resistor connected between the junction of said rectifiers and the midpoint of said first resistor, and a third input terminal connected to said junction of said rectifiers, said first and second capacitors having substantially equal reactances at a first frequency, and said third and fourth capacitors having substantially equal reactances at said first frequency.

4. Signal-mixing apparatus comprising first and second input terminals, first and second capacitors each connected at one side to one of said terminals, a first resistor joining the remaining sides of said capacitors, first and second rectifiers connected in series with the same polarity across said first resistor, third and fourth capacitors connected in series across said first resistor, an output terminal at the junction of said third and fourth capacitors, a second resistor connected between the junction of said rectifiers and ground, a ground connection at the midpoint of said first resistor, and means to apply a signal voltage across said second resistor, said first and second capacitors having substantially equal reactances at a first frequency, and said third and fourth capacitors having substantially equal reactances at said first frequency.

References Cited in the file of this patent

UNITED STATES PATENTS

| | | |
|---|---|---|
| 2,492,863 | Hays | Dec. 27, 1949 |
| 2,545,232 | Hings | Mar. 13, 1951 |